(12) United States Patent
Wang et al.

(10) Patent No.: US 9,063,708 B2
(45) Date of Patent: Jun. 23, 2015

(54) ELECTRONIC DEVICE, STORAGE MEDIUM AND METHOD FOR VALIDATING SPEED OF A FAN THEREOF

(75) Inventors: Guang-Jian Wang, Shenzhen (CN);
Xiao-Mei Liu, Shenzhen (CN);
Jin-Rong Zhao, Shenzhen (CN);
Xiao-Jun Fu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 791 days.

(21) Appl. No.: 13/327,782

(22) Filed: Dec. 16, 2011

(65) Prior Publication Data
US 2013/0050471 A1    Feb. 28, 2013

(30) Foreign Application Priority Data

Aug. 31, 2011 (CN) .......................... 2011 1 0255413

(51) Int. Cl.
*H04N 7/18* (2006.01)
*G06F 1/20* (2006.01)

(52) U.S. Cl.
CPC ......................................... *G06F 1/20* (2013.01)

(58) Field of Classification Search
None
See application file for complete search history.

(56) References Cited

U.S. PATENT DOCUMENTS 8,528,317 B2 * 9/2013 Gerez et al. ..................... 60/223

* cited by examiner

*Primary Examiner* — Sath V Perungavoor
*Assistant Examiner* — Kate Luo
(74) *Attorney, Agent, or Firm* — Novak Druce Connolly Bove + Quigg LLP

(57) ABSTRACT

In a method for validating speed of a fan of an electronic device, different speeds of the fan are set for validation. The method controls the fan to operate under each of the set speeds in turn, and controls a camera device to continuously capture images of the fan with a shutter speed of the camera device corresponding to the set speed. The images are transmitted to a comparison unit to be analyzed for sameness and clarity. The fan is determined to work abnormally if not all the images are sameness or if at least one image is unclear, and the fan is determined to work normally if all the images are sameness or clear. A validation report is generated to indicate whether the fan is normal or abnormal according to the determination.

18 Claims, 3 Drawing Sheets

ELECTRONIC DEVICE, STORAGE MEDIUM AND METHOD FOR VALIDATING SPEED OF A FAN THEREOF

BACKGROUND

1. Technical Field

Embodiments of the present disclosure relate to validation systems and methods, and more particularly to an electronic device, a storage medium and a method for validating speed of a fan of the electronic device.

2. Description of Related Art

Testing and validation of speed of a rotational object, such as, a motor or a fan of an electronic device, is important. The speed of the fan is mostly tested through reading from a pulse-width modulation (PWM) register, but errors and lack of precision may occur. Furthermore, if there is a declination generated by the PWM register, inaccuracies in the speed may be generated. Therefore, it is difficult to validate whether the fan of the electronic device works normally or abnormally.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 1:
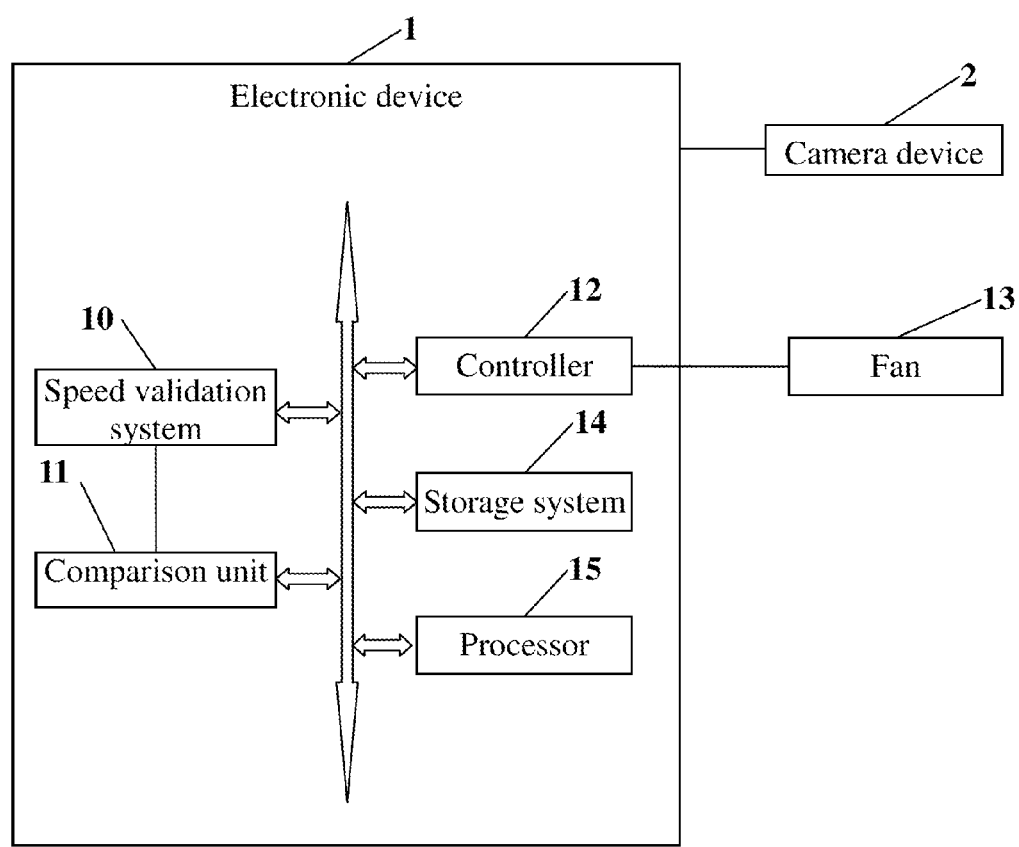
FIG. 1 is a block diagram of one embodiment of an electronic device including a speed validation system.
Figure 2:
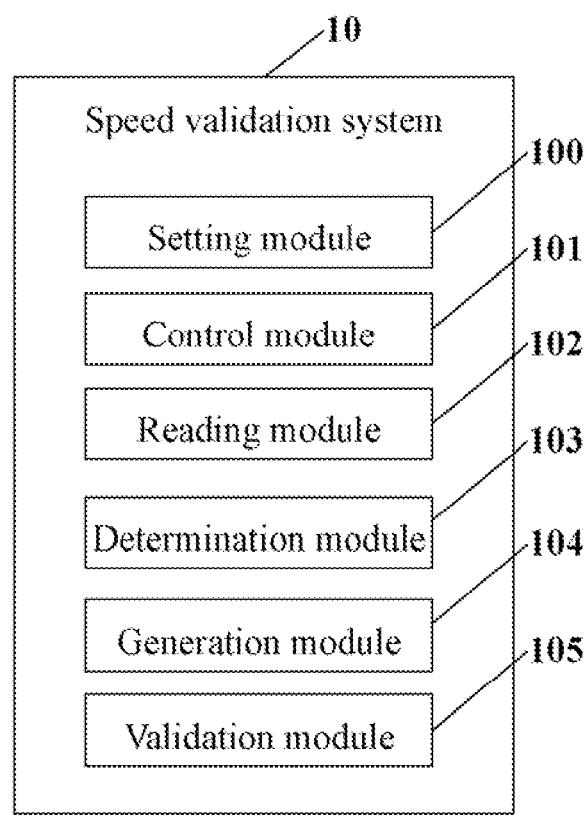
FIG. 2 is a block diagram of function modules of the speed validation system included in the electronic device of FIG. 1.

FIG. 1 is a block diagram of one embodiment of an electronic device 1 including a speed validation system 10. In one embodiment, the electronic device 1 may be a desktop computer, a notebook computer, or a server, for example. The electronic device 1 includes a comparison unit 11, a controller 12 connected to a fan 13, a storage system 14, and at least one processor 15. The controller 12 is configured to control the speed of the fan 13. In one embodiment, the fan 13 may be mounted inside the electronic device 1, or outside (as shown in FIG. 1) and connected to the electronic device 1. The fan 13 may be used to cool components of the electronic device 1, such as the storage system 14 and the processor 15, for example. In one embodiment, the fan 13 may be outside the electronic device 1 for testing or examining the fan 13 conveniently, such as validating the fan 13 before the fan 13 is mounted inside the electronic device 1, for example.

The electronic device 1 electronically connects to a camera device 2, and controls the camera device 2 to capture images of the fan 13. The camera device 2 may be located at a position where images of the fan 13 can be captured. The speed validation system 10 may validate whether the fan 13 works normally or abnormally by comparison of images of the fan 13 captured by the camera device 2 through the comparison unit 11. When the fan 13 is set to operate one speed, working abnormally represents that an actual speed of the fan 13 is different from the set speed; wording normally represents that the actual speed of the fan 13 is same to the set speed.

The comparison unit 11 analyzes whether each of the images of the fan 13 is clear by determining whether or not a predetermined percent of outline (e.g. 80%) of a fan blade can be extracted from the image. The comparison unit 11 further compares whether each of the images of the fan 13 is sameness (or similar) by determining whether a predetermined percent of pixels (e.g. 80%) of the images are sameness. The camera device 2 can capture the images with different shutter speeds, such as $1/40$ second, $1/60$ second, or $1/50$ second, for example.

In one embodiment, the controller 12 may be a basic input/output system (BIOS), or a baseboard management controller (BMC). The controller 12 may send a pulse-width modulation (PWM) having a certain duty cycle as a signal (a duty cycle instruction) to control the speed of the fan 13. The PWM duty cycles correspond to the speed of the fan in revolutions per minute (RPM) value. For example, if the PWM duty cycle instruction is 20%, the equivalent speed of the fan 13 may be 850 RPM.

The storage system 14 stores data of the electronic device 1. In one embodiment, the storage system 14 may be a memory within the electronic device 1, or an external storage card, such as a smart media card, or a secure digital card. The at least one processor 15 executes one or more computerized codes and other applications of the electronic device 1, to provide functions of the speed validation system 10.

In the embodiment, the speed validation system 10 may include a setting module 100, a control module 101, a reading module 102, a determination module 103, a generation module 104 and a validation module 105. The modules 100, 101, 102, 103, 104, and 105 comprise computerized codes in the form of one or more programs that are stored in the storage system 14. The computerized codes include instructions that are executed by the at least one processor 15 to provide functions for the modules. Details of each of the modules will be given.

Figure 3:
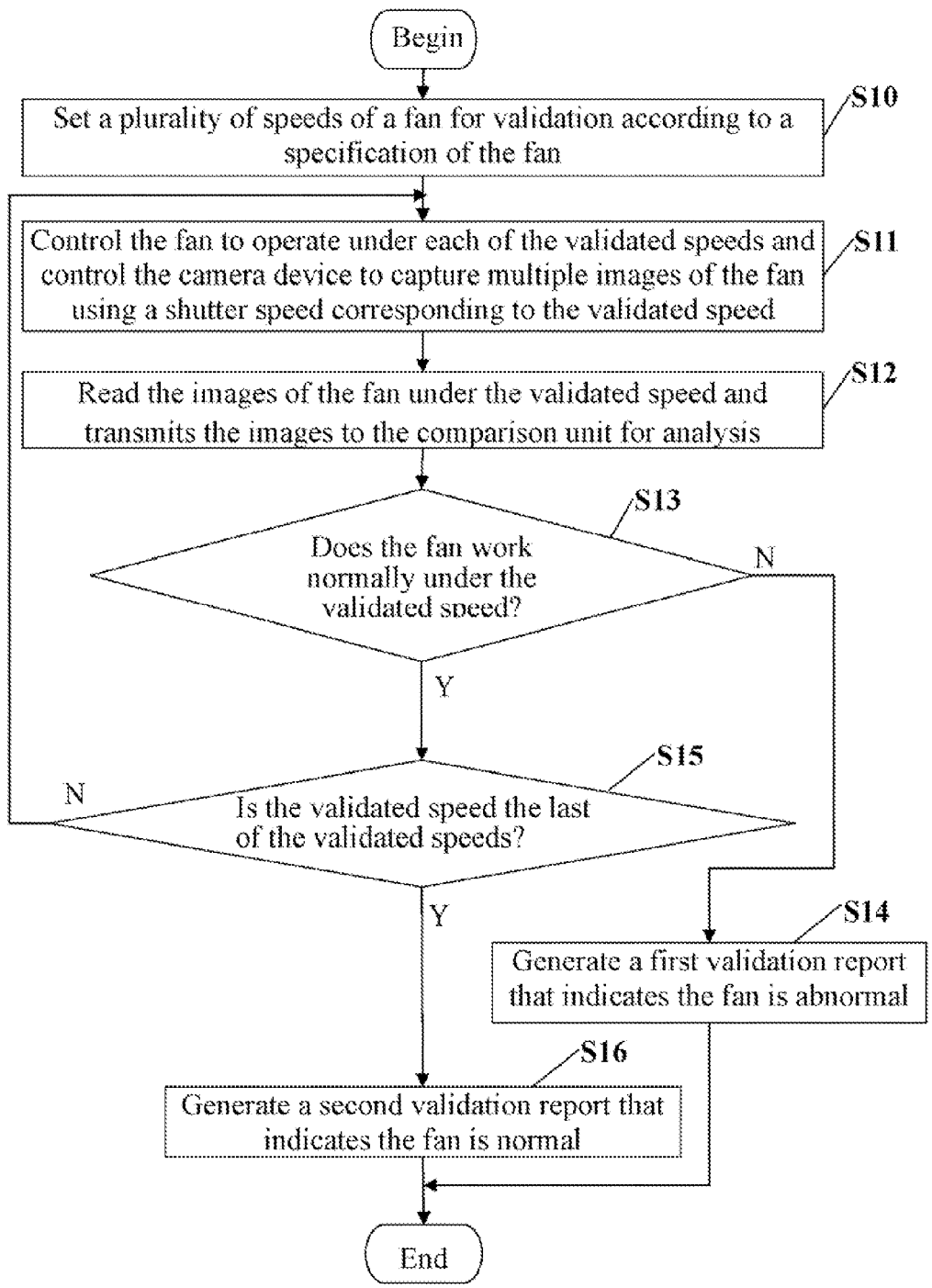
FIG. 3 is a flowchart of one embodiment of a method for validating speed of a fan of the electronic device of FIG. 1.

FIG. 3 is a flowchart of one embodiment of a method for validating the speed of a fan of an electronic device, such as the fan 13 of the electronic device 1 of FIG. 1. Depending on the embodiment, additional blocks may be added, others deleted, and the ordering of the blocks may be changed.

In block S10, the setting module 100 sets a plurality of speeds of the fan 13 for validation according to a specification of the fan 13. In one embodiment, the set speeds of the fan 13 may be set as 0 RPM, 3000 RPM, and 3600 RPM.

In block S11, the control module 101 controls the fan 13 to operate at each of the set speeds in turn through the controller 12, and controls the camera device 2 to continuously capture images of the fan 13 using a shutter speed of the camera device 2 corresponding to the set speed. In one embodiment, if the speed of the fan 13 is equal to X RPM (i.e., where X represents one of the set speeds, and is not equal to 0), the shutter speed of the camera device 2 is set to be 60/X second(s). For example, if the set speed of the fan 13 is equal to 3000 RPM (i.e., 50 revolutions per second), the shutter speed of the camera device 2 is set to be $60/3000$, or $1/50$ second. If the set speed is 0 RPM, the shutter speed of the camera device 2 does not need to be reset, and the camera device 2 may capture images of the fan 13 with a current or any shutter speed of the camera device 2. In one embodiment, a number of the images may be 2 or 5.

In block S12, the reading module 102 reads the images of the fan 13 under the set speed from the camera device 2, and transmits the images to the comparison unit 11 to be analyzed. If the set speed is equal to 0 RPM, the images of the fan 13 are transmitted to the comparison unit 11 to compare whether each of the images is sameness. If the set speed is not equal to 0 RPM, that is the set speed is greater than 0 RPM, the images are transmitted to the comparison unit 11 to determine whether each of the multiple images is clear.

In block S13, the determination module 103 validates whether the fan 13 works normally under the set speed according to a comparison result generated by the comparison unit 11. In one embodiment, since the shutter speed of the camera device 2 corresponds to the set speed, each image of the fan 13 captured by the camera device 2 should be looks like motionless. That is, each image of the fan 13 should be clear. If the image of the fan 13 is unclear, a current actual speed of the fan 13 may be different from the set speed. If the set speed is equal 0 RPM, the fan 13 should be motionless, and all the images of the fan 13 under the 0 RPM should be sameness. If not all the images are sameness, the fan 13 may work abnormally.

Referring to block S13 as described above, if at least one image of the fan 13 under the set speed is not identical to the others, or at least one image is unclear, the determination module 103 determines that the fan 13 works abnormally under the set speed, and block S14 is implemented. If all the images of the fan 13 are sameness and clear, the determination module 103 determines that the fan 13 works normally under the set speed, and block S15 is implemented.

In block S14, the generation module 104 generates a first validation report that indicates the fan 13 is abnormal, and procedure ends. For example, the generation module 104 may generate the first validation report for recording that the fan 13 work abnormally under the set speed.

In block S15, the validation module 105 determines whether the set speed is the last of the set speeds. If the set speed is the last of the set speeds, block S16 is implemented. If the set speed is not the last of the set speeds, a next set speed of the fan 13 should be implemented for validation and block S11 is repeated.

In block S16, the generation module 104 generates a second validation report that indicates the fan 13 is normal. For example, the generation module 104 may generate the second validation report for recording that the fan 13 works normally under all the set speeds.

All of the processes described above may be embodied in, and fully automated via, functional code modules executed by one or more general purpose processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

The described embodiments are merely possible examples of implementations, and have been set forth for a clear understanding of the principles of the present disclosure. Many variations and modifications may be made without departing substantially from the spirit and principles of the present disclosure, and all such modifications and variations are intended to be included herein within the scope of this disclosure and the described inventive embodiments, and the present disclosure is protected by the following claims.

What is claimed is:

1. A computer-implemented method for validating speed of a fan of an electronic device, the electronic device electronically connected to a camera device, the method comprising:

setting a plurality of speeds of the fan for validation;

controlling the fan to operate under each of the set speeds in turn, and controlling the camera device to continuously capture multiple images of the fan using a shutter speed of the camera device corresponding to the set speed;

reading the images of the fan from the camera device, and transmitting the images to a comparison unit of the electronic device for analysis;

determining that the fan works abnormally under the set speed if the images of the fan are not sameness or at least one image is unclear, or determining that the fan works normally under the set speed if all the images of the fan are sameness or clear; and generating a first validation report indicating that the fan is abnormal if the fan works abnormally under one of the set speeds, or generating a second validation report indicating that the fan is normal if the fan works normally under all the set speeds.

2. The method as claimed in claim 1, wherein the set speed of the fan is controlled by sending a pulse-width modulation duty cycle instruction to the fan through a basic input/output system or a basic management controller.

3. The method as claimed in claim 1, wherein the shutter speed of the camera device is set to be 60/X if the set speed of the fan is equal to X revolutions per minute (RPM), and the shutter speed does not need to be reset if the set speed is equal to 0 RPM.

4. The method as claimed in claim 1, wherein the comparison unit compares whether the images of the fan are sameness if the set speed is equal to 0 RPM, and analyzes whether the images of the fan are clear if the set speed is not equal to 0 RPM.

5. The method as claimed in claim 1, wherein the comparison unit analyzes whether each of the images is clear by determining whether a predetermined percent of outline of the fan blade is extracted in the image, and compares whether the images are sameness by determining whether a predetermined percent of pixels of the images are sameness.

6. The method as claimed in claim 1, wherein the fan is inside the electronic device, or outside of the electronic device.

7. A non-transitory storage medium storing a set of instructions, when executed by at least one processor of an electronic device, cause the at least one processor to perform a method for validating speed of a fan of the electronic device, the method comprising:

setting a plurality of speeds of the fan for validation;

controlling the fan to operate under each of the set speeds in turn, and controlling a camera device electronically connected to the electronic device to continuously capture multiple images of the fan using a shutter speed of the camera device corresponding to the set speed;

reading the images of the fan from the camera device, and transmitting the images to a comparison unit of the electronic device for analysis;

determining that the fan works abnormally under the set speed if the images of the fan are not sameness or at least one image is unclear, or determining that the fan works normally under the set speed if all the images of the fan are sameness or clear;

generating a first validation report indicating that the fan is abnormal if the fan works abnormally under one of the set speeds, or generating a second validation report indicating that the fan is normal if the fan works normally under all the set speeds.

8. The storage medium as claimed in claim 7, wherein the set speed of the fan is controlled by sending a pulse-width modulation duty cycle instruction to the fan through a basic input/output system or a basic management controller.

9. The storage medium as claimed in claim 7, wherein the shutter speed of the camera device is set to be 60/X if the set speed of the fan is equal to X revolutions per minute (RPM), and the shutter speed does not need to be reset if the set speed is equal to 0 RPM.

10. The storage medium as claimed in claim 7, wherein the comparison unit compares whether the images of the fan are sameness if the set speed is equal to 0 RPM, and analyzes whether the images of the fan are clear if the set speed is not equal to 0 RPM.

11. The storage medium as claimed in claim 10, wherein the comparison unit analyzes whether each of the images is clear by determining whether a predetermined percent of outline of a fan blade is extracted in the image, and compares whether the multiple images are sameness by determining whether a predetermined percent of pixels of the images are sameness.

12. The storage medium as claimed in claim 7, wherein the fan is inside the electronic device, or outside the electronic device.

13. An electronic device, comprising:
a fan;
a storage system;
at least one processor; and
one or more programs that are stored in the storage system and executed by the at least one processor, the one or more programs comprising:
a setting module operable to set a plurality of speeds of the fan for validation;
a controlling module operable to control the fan to operate under each of the set speeds in turn, and control a camera device electronically connected to the electronic device to continuously capture multiple images of the fan using a shutter speed of the camera device corresponding to the set speed;
a reading module operable to read the images of the fan from the camera device, and transmit the images to a comparison unit of the electronic device for analysis;
a determination module operable to determine that the fan works abnormally under the set speed if the images of the fan are not sameness or at least one image is unclear, or determine that the fan works normally under the set speed if all the images of the fan are sameness or clear,
a generation module operable to generate a first validation report indicating that the fan is abnormal if the fan works abnormally under one of the set speeds, or generate a second validation report indicating that the fan is normal if the fan works normally under all the set speeds.

14. The electronic device as claimed in claim 13, wherein the control module controls the set speed of the fan by sending a pulse-width modulation duty cycle instruction to the fan through a basic input/output system or a basic management controller.

15. The electronic device as claimed in claim 13, wherein the shutter speed of the camera device is set to be 60/X if the set speed of the fan is equal to X revolutions per minute (RPM), and the shutter speed does not need to be reset if the set speed is equal to 0 RPM.

16. The electronic device as claimed in claim 13, wherein the comparison unit compares whether the images of the fan are sameness if the set speed is equal to 0 RPM, and analyzes whether the images of are clear if the set speed is not equal to 0 RPM.

17. The electronic device as claimed in claim 16, wherein the comparison unit analyzes whether each of the images is clear by determining whether a predetermined percent of outline of a fan blade is extracted in the image, and compares whether the images are sameness by determining whether a predetermined percent of pixels of the images are sameness.

18. The electronic device as claimed in claim 13, wherein the fan is inside the electronic device, or outside the electronic device.

* * * * *